(12) United States Patent
Trinh et al.

(10) Patent No.: US 9,288,327 B2
(45) Date of Patent: Mar. 15, 2016

(54) APPARATUS AND METHOD FOR ROUTING AN INCOMING CALL

(71) Applicants: Trung Tim Trinh, Nepean (CA); Tom Gray, Mansfield (CA)

(72) Inventors: Trung Tim Trinh, Nepean (CA); Tom Gray, Mansfield (CA)

(73) Assignee: Mitel Networks Corporation, Ottawa (CA)

(*) Notice: Subject to any disclaimer, the term of this patent is extended or adjusted under 35 U.S.C. 154(b) by 0 days.

(21) Appl. No.: 14/277,157

(22) Filed: May 14, 2014

(65) Prior Publication Data

US 2015/0334242 A1 Nov. 19, 2015

(51) Int. Cl.
| | |
|---|---|
| *H04M 11/10* | (2006.01) |
| *H04M 3/54* | (2006.01) |
| *H04W 4/12* | (2009.01) |
| *H04M 3/533* | (2006.01) |
| *H04W 40/02* | (2009.01) |
| *H04W 4/18* | (2009.01) |
| *G10L 15/26* | (2006.01) |
| *G06F 17/27* | (2006.01) |

(52) U.S. Cl.
CPC ........... *H04M 3/541* (2013.01); *G06F 17/2785* (2013.01); *G10L 15/265* (2013.01); *H04M 3/533* (2013.01); *H04W 4/12* (2013.01); *H04W 4/18* (2013.01); *H04W 40/02* (2013.01)

(58) Field of Classification Search
CPC ......... H04W 4/12; H04W 4/18; H04W 40/02; H04M 3/541; H04M 3/533; G10L 15/26; G10L 15/265; G06F 17/2785
USPC .................. 455/413, 414, 412.1–412.2, 563; 379/142.05, 202.01, 88.18, 379/88.22–88.26, 204.01, 207.03; 704/235, 704/255
See application file for complete search history.

(56) References Cited

U.S. PATENT DOCUMENTS

| | | |
|---|---|---|
| 8,340,262 B1 | 12/2012 | Cermak et al. |
| 2003/0177008 A1* | 9/2003 | Chang ........................... 704/255 |
| 2007/0172042 A1* | 7/2007 | Winikoff et al. ......... 379/142.05 |
| 2009/0086953 A1 | 4/2009 | Vendrow |
| 2009/0325544 A1* | 12/2009 | Deutsch et al. ............... 455/413 |
| 2013/0016819 A1 | 1/2013 | Cheethirala |
| 2013/0018656 A1* | 1/2013 | White et al. .................. 704/235 |
| 2014/0126710 A1* | 5/2014 | Boss et al. ............... 379/202.01 |

* cited by examiner

*Primary Examiner* — Wayne Cai

(57) ABSTRACT

An apparatus and method for routing an incoming call includes the apparatus configured to perform a routing decision resulting in the incoming call being routed to the voicemail of a called user. The apparatus further creates a transcription of a voicemail message being recorded on the voicemail of the called user. This is done by applying a speech analysis process to the voicemail message as the voicemail message is being recorded. Information about a context of the incoming call is determined from the transcription and a second routing decision is performed based on the information.

14 Claims, 3 Drawing Sheets

APPARATUS AND METHOD FOR ROUTING AN INCOMING CALL

FIELD OF THE INVENTION

The present invention relates to a system, method and apparatus for routing an incoming call.

BACKGROUND OF THE INVENTION

Many people now have multiple communication means available to them at any one time, such as the use of a business phone, personal phone, email, instant messaging and social media. In a business context, this means that users are increasingly contactable even when they are away from their office. Modern communication systems allow information such as the location and schedule of a user to be used to decide to which communication means to route an incoming communication, also making that user more contactable.

A user may therefore establish rules as to how they should be contacted or not contacted in various circumstances. In particular, as many user will always have some communication means with them, they may establish rules which prevent them from being contacted at certain times (for example after 7 pm) or in certain circumstances (for example while they are in a meeting). Instead, communication attempts made at these times may be routed to the user's voicemail.

However, this may lead to situations in which the user misses an important call and/or in which the caller becomes annoyed with the user or user's company because their call has not been answered.

BRIEF DESCRIPTION OF THE DRAWINGS

Embodiments will now be described, by way of example only, with reference to the accompanying drawings, in which.

DETAILED DESCRIPTION

Figure 1:
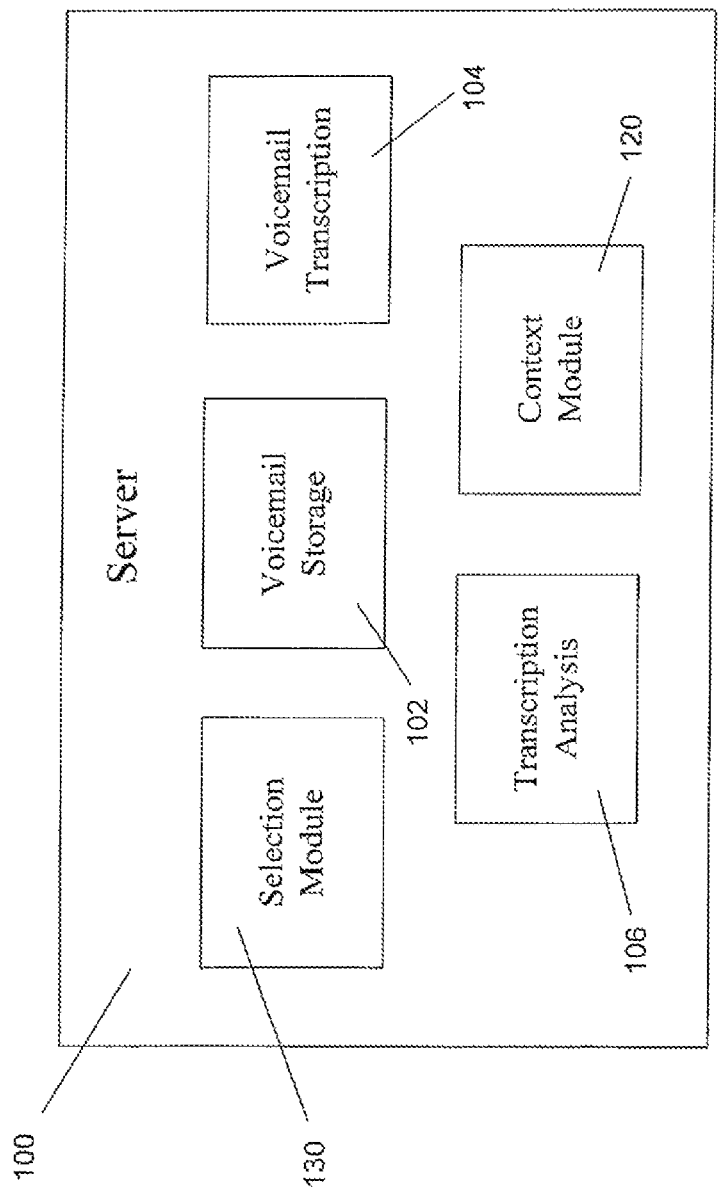
FIG. 1 is a schematic illustration of an exemplary server suitable for implementing the invention.

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

FIG. 1 shows an example embodiment of a server system 100 for routing incoming phone calls to a user and for making a second routing decision based on information extracted from a voicemail message.

The server system 100 may for example be a Private Branch Exchange (PBX) server, an internet protocol (IP) call server, or another type of server configured to receive and route telephonic information. The server system 100 may be embodied in a single apparatus or may be distributed across a number of different apparatus.

The server 100 comprises a selection module 130, a voicemail module 102, a voicemail transcription module 104, a transcription analysis module 106 and a context module 120.

The context module 120 is configured to store or have access to information about the called user, for example the user's current presence and location and the user's schedule/calendar as well as the user's communication preferences. The context module 120 may also be provided with a caller ID of the calling party and may store or have access to a list of contacts of the called user with which the caller ID can be compared. The called user may be a member of one or more collaborative groups within their organization. The context module may also have access to the details of various collaborative groups allowing for improved call context determination and call routing.

The selection module 130 is configured to make routing decisions about incoming communications. The selection module 130 may make routing decisions in conjunction with the context module 120 by accessing information from the context module. The selection module 130 may also store or have access to information regarding the called user's communication devices (also referred to herein as communication resources or endpoints), such as the location of each device, whether the device is mobile or fixed and what the communication capabilities of each device are.

The voicemail module 102 represents the user's voicemail application and voicemail message storage. The voicemail module 102 may be configured to answer calls routed to it, play messages to the caller and to record voicemail messages. The voicemail transcription module 104 comprises a speech analysis program which listens to voicemail messages as they are being recorded in the voicemail module 102 and produces a written transcription of the message in real time or near real time. Although the voicemail transcription module 104 is shown as a separate module, it may in some embodiments be integrated into the voicemail module 102 as a single "voicemail and voicemail transcription application".

The transcription analysis module 106 is configured to access the transcription produced by the voicemail transcription module 104 and to analyse it in order to determine information about the call and/or caller. The transcription analysis module 106 may comprise a database of words and phrases and a number of rules linking certain words/phrases to conclusions regarding the context of the call and/or information about the caller. For example, phrases such as 'close my account', 'see everything', 'cancel my order' etc. from an external customer can indicate a customer retention issue. Words such as 'disappointed', 'unacceptable' etc. can indicate that the caller is particularly unhappy.

Alternatively or in addition, the voicemail transcription module 104 may use a speech analysis algorithm to detect emotions in the speech patterns of the caller during the voicemail recording. For example, the voicemail transcription module 104 may associate attributes such as anger, urgency or stress with the voicemail recording. These attributes may be associated with the voicemail recording in addition to information about the 'context' of the call determined from the transcription of the message. This dual 'context and emotion' information may allow the call to be more appropriately re-routed compared with using only a single piece of context or emotional information.

As the transcription analysis module 106 is configured to postulate a context of the call based on the voicemail transcription, it may be integrated with the context module 120 into a single voicemail analysis application/module.

The selection module 130 is configured to make a second routing decision based on the information produced by the transcription analysis module 106. For example, if the transcription analysis module 106 determines that there may be a customer retention issue, then the selection module 130 may decide to route the call to the person concerned with the maintenance of the relationship with this customer. This may be the called user, the called user's supervisor or another member of the organization. As a further example, if the identity of the caller was not previously determined, but as a result of the transcription analysis is determined to be an important client, the call may be routed to the user. If the call cannot be answered by the called user, but as a result of the transcription analysis is determined to be an important call, the call may be routed to another user. This other user may be the called user's personal assistant. Alternatively, the call may be routed to another member of the called user's organization, such as a member of the same collaborative team. The selection module 130 may be configured to indicate the reason for the re-routing when re-routing the call, for example via an automated announcement. The announcement may be played to the answering endpoint before the call is re-routed. The announcement may comprise a transcription or partial transcription of the voicemail message.

Exemplary operation of the system 100 will now be described. When the server 100 receives a call for a user, the selection module 130 determines either that the call should be routed to the user's voicemail, or to a communication device of the user, which is not answered by the user, resulting in the call be forwarded to the user's voicemail. The selection module 130 may consult the context module 120 in making the initial routing decision. Thus, in the present invention, the incoming call is initially answered by the user's voicemail.

The caller then begins to leave a voicemail which is handled by and stored in the voicemail module 102. As the voicemail is being recorded, it is transcribed by the voicemail transcription module 104. The transcription is passed immediately to the transcription analysis module 106 (or else the voicemail transcription module 104 and transcription analysis module 106 are integral), so that further information about the context of the call and/or the caller can be obtained while the voicemail is being recorded.

The selection module 130 then uses the result of the transcription analysis to perform a second routing decision. The outcome of this second routing decision is generally that the call will be routed to an endpoint other than voicemail. However in some circumstances, for example where no extra context information has been obtained form the voicemail transcription or where the call is identified as not important, the decision may be to allow the voicemail to continue.

Figure 2:
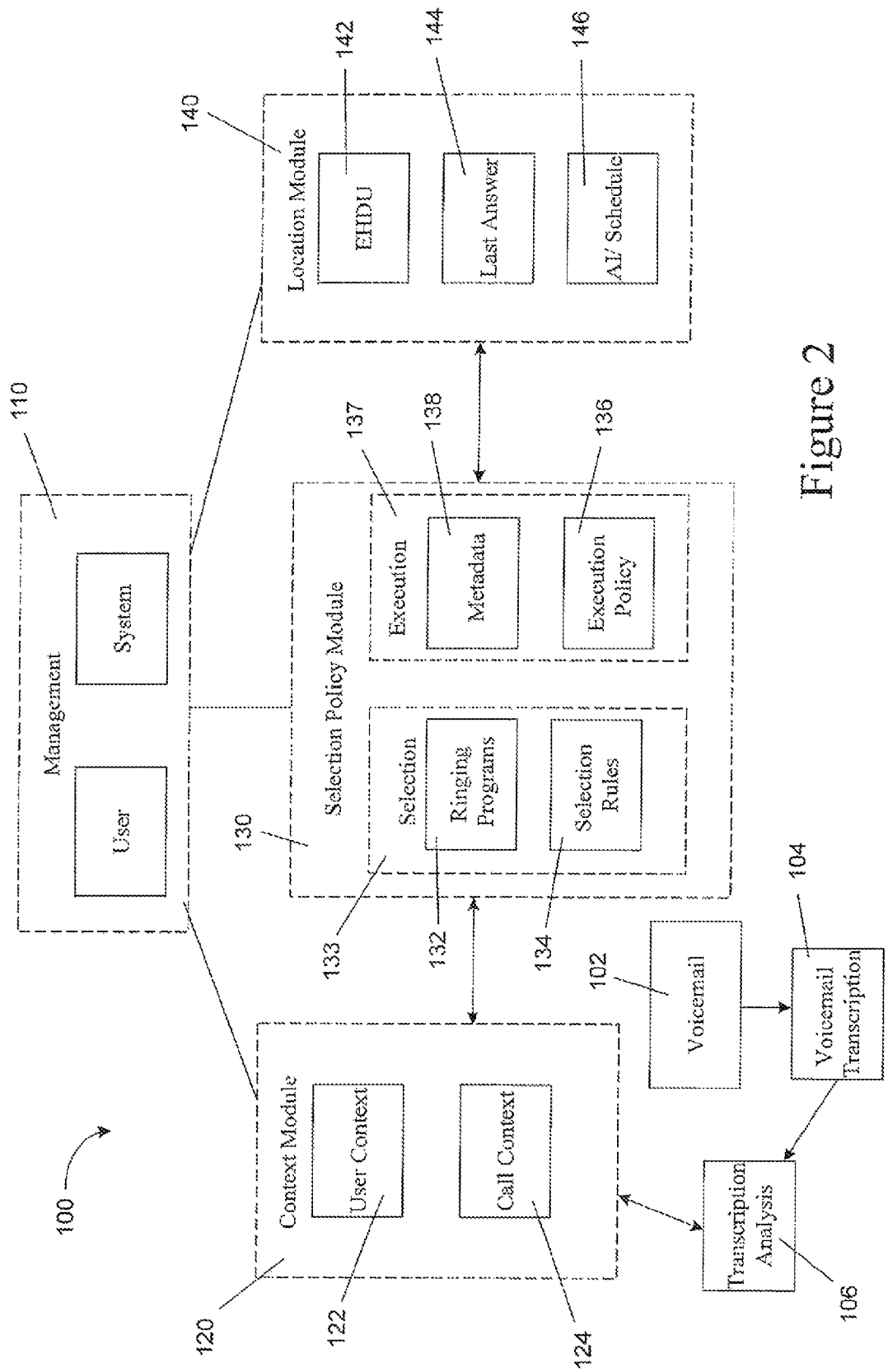
FIG. 2 is a schematic illustration of a further exemplary server suitable for implementing the invention.

FIG. 2 shows a further example embodiment of a server system 100 for routing incoming phone calls to a user and for making a second routing decision based on information extracted from a voicemail message. In particular, FIG. 2 shows further optional features of the context module 120 and selection module 130 as well as additional management and location modules. Unless stated otherwise, those components present in both of FIGS. 1 and 2 function in a similar manner as described with reference to FIG. 1, although some additional functionality is also described below.

The exemplary server system 100 is illustrated in four main blocks, also referred to herein as modules. A management module 110 enables a user or system supervisor to set up and control the system. A context module 120 provides context awareness of both the caller and the user. A location module 140 is used to determine a location of the user at the time a call is received. A selection policy module 130 provides selection policies based on metadata, policy data, and input from the management 110, context 120, and location 140 modules. Each module may run on a different apparatus or device and may be distributed geographically. Alternatively, one or more of the modules may run on the same apparatus or device.

The context module 120 includes a user context module 122 and a call context module 124. The user context module 122 may be in communication with a server, or group of servers that enable contextual information for the user to be obtained in near real time. For example, the user context module 122 may be in communication with a calendar server such as a Microsoft Exchange Server®. By accessing the calendar information in the Microsoft Exchange Server, a location of the called user (i.e. the person to whom the phone call was made) can be determined. The status of this user may also be determined. If the user indicates that he or she is in a meeting, that information can be taken into account. Additional information can also be used, such as whether the user is out of the office, or not available to communicate. If the person is in a meeting, the location of the meeting may be available in the calendar information. For example, a specific conference room may be listed or reserved. The context information can be used to determine how to route the phone call from the caller to the user. Additional details related to the use of context information are provided in U.S. Pat. No. 7,415, 104, which is hereby incorporated by reference.

The call context module 124 is configured to obtain identity information for a phone call received at the server 100. For example, the call context module 124 may obtain caller identification information (caller ID), also referred to as call display. The caller ID may be in the single data message format (SDMF) or multi data message format (MDMF). The call context module 124 may also receive automatic number identification information, or another type of information to enable telephone number and/or identification of the caller to be discovered. The call context module 124 contains contact information associated with a business's clients, customers, employees, acquaintances, and other desired associates. The contact information can include background information for the caller, including the person's name, employer, title, phone numbers, email address, and so forth. The identity information can be matched with a specific person's contact information. For example, a phone number obtained at the server 100 from the caller ID can be matched with a contact file and associated with a specific person. Selected background information for the caller can then be used to route his or her phone call as needed.

Using the information obtained by the user context module 122 from the user's calendar and schedule, the user's likely location and co-presence may be determined. For an incoming call, the user context module 122 can provide the information necessary to determine the ability of a user to answer a phone call based on the user's context. The information obtained by the call context module 124 can be used to determine who a call is from. This information can then be linked to an expanded information set. For example, caller ID information sent from the call server to the user context module can identify the phone number of the call as (613) 592-2122. The user context module can determine that this is a call from user Ann Rowe's directory number and that Ann Rowe is the user's boss. This information can be made available to the selection policy module 130.

Further information regarding determining the context of a call can be found in published US patent application US2009/0248464, which is hereby incorporated by reference in its entirety.

The location module 140 is used to determine the current location of the user. Various techniques may be used. For example, the location of the user's external hot desk (EHDU) assignment can be obtained from the EHDU module 142. The location where the user last answered or originated a call may be obtained from the last answer module 144. In addition, the user's schedule can provide an estimate of the user's current location from the schedule module 146. This information may alternatively, or additionally, be obtained from the user context module 122 in the context module 120. The outputs from these modules can be specified in ringing programs by the use of reserved values for location. The values 'ehdu', 'last' and 'schedule' can be used to designate the source from which location data can be obtained. Moreover, the location module 140 can be used to combine all estimates into one that is most likely and supply the estimate as well. The value 'likely' can be used to describe a combined estimate of the user's location. The information from the location module 140 is useful for the second routing decision, if it determined that the call should be routed to the user.

The selection policy module 130 is divided into two sections, a selection group 133 and an execution group 137. The selection group is comprised of a ringing program module 132 (also referred to herein as a cascaded ringing program module) and a selection rules module 134. The execution group is comprised of a metadata module 138 and an execution policy module 136.

The ringing program module 132 can include one or more cascaded ringing programs. Each cascaded ringing program can include a combination of serial and parallel forking. For instance, a sequence of parallel forks can be initiated in sequence. Each of these forks includes a selection of one or more of the user's plurality of communication devices. Each fork can include an attempt to reach the user in a different way. The different attempts to reach the user may be more or less appropriate to the goal of connecting the user to the phone call, while taking into account the user's current context. The sequence of these forks is designed to deal with the postulated context of the user and other contingencies that may be occurring at the time of the phone call.

Each individual fork within a ringing program can be delimited by a fork element. A fork element is a program that is run to route the phone call to one or more of the user's communication resources. A timeout attribute can be set to provide a maximum amount of time that the ringing program will remain in the fork element. For example, a fork element that includes routing the phone call to the user's desk phone may last for 5 seconds. If the phone call isn't answered within the five second period then the program will move on to the next fork.

The selection rules module 134 contains rules that link the call in context to the most appropriate ringing program. Individual rules may be selected by the user to identify the desired ringing program for various different user contexts. Alternatively, predetermined sets of rules may be selected and applied based on the context of the user. For example, a user may define a rule such as: "for calls from customers while I am in a meeting, use Ringing Program 1; for calls from my boss while I am in a meeting, use Ringing Program 2; for calls from client X always use Ringing Program 3." The rules may be applied to groups of people, such as customers, or to individual people, such client X. This may be most effective for applying a rule to sets of people. Alternatively, a rule for a particular client may be stored with the background information for the particular client, such as in the call context module 124. If no particular rules are selected for a caller, then the generic rules in the selection policy module may be applied.

Where rules have conflicts, a conflict mechanism can be used to select one of the rules for implementation. In some embodiments, each contact stored in the user's contact database may be identified to different levels of specificity. Continuing with the previous example in which the caller was "Ann Rowe", the most specific information is "Ann Rowe"

and/or Ann Rowe's number, (613) 592-2122. The next level of specificity is that Ann Rowe is the called user's direct boss. The third level of specificity may be that Ann Rowe is a member of the same organization and/or a management level contact. Further levels of specificity, for example to do with the caller's physical location may also be defined in the contact directory. When a call is received, rules using information of varying degrees of specificity are activated and propose their associated ringing program for execution. If there is a conflict, the conflict resolving mechanism will select the ringing program with the highest specificity rule. This ringing program should most closely match the current user context and thus most closely match the current needs of the user.

If multiple rules have the same priority or specificity, then the most recently used ringing program is used. If this does not select a single rule, then a random rule selection may be made.

The examples are not intended to provide a complete set of rules. Rules can be selected and established based on the needs of the user. Users with unique needs can set up unique rules to select desired ringing programs based on those needs. Further information regarding cascaded ringing programs which can be used in the present invention can be found in US Pub. US 2010/0267374, which is hereby incorporated by reference in its entirety.

The metadata module 138 in the execution module 137 stores information that can be accessed by the ringing program module 132. For instance, the plurality of communication devices associated with a user can be listed in the metadata module. The ringing program module 132 can indicate a selection of devices. Each device's address, such as the device's directory number, URL address, or other type of address can be stored in the metadata module. The metadata module can also include information related to the protocol through which a selected communication device is operated. The metadata module can also include additional variables, such as whether the device is fixed or mobile, local to the business or located remotely, whether the expected operator of the device is human, robot, the user, an assistant, and so forth.

The ability to store information related to the user's communication devices in the metadata module 138 enables ringing programs to be formed that are independent of the user's particular communication resources. This enables ringing programs to be created that can be used by a variety of people. The ability to create generic ringing programs enhances the usefulness of the system. While people generally like to be more productive, they are often hesitant to spend the time necessary to create the individual rules needed to select a proper ringing program. By using the separate metadata, generic ringing programs can be used by people, and then modified to fit their specific needs. In addition, as the user's communication devices change, such as when a new cell phone is purchased or the user moves offices or changes an office phone, the device list and other metadata information can be easily updated without requiring extensive changes to the ringing programs.

The server system 100 of FIG. 2 also comprises the voicemail module 102, voicemail transcription module 104 and transcription analysis module 106 as described with reference to FIG. 1.

As previously mentioned, the selection module 130 is configured to make a second routing decision based on the information produced by the transcription analysis module 106. This causes the current ringing program to be aborted and triggers an additional ringing program to route the call to a more appropriate endpoint. The more appropriate endpoint may be determined using information available to the context module 120 regarding collaborative groups within the user's organization. Thus the context module 120 may store or have access to relationship information for each user within the organization. The voicemail transcription analysis may allow an appropriate collaborative group to be identified where it could not be identified before.

In general, the second routing decision results in the call being answered by a person, either the called user or another member of the user's organization. This results in an improved service from the point of view of the caller and an improved method of dealing with calls which are important (but which may not initially be recognized as important), while still allowing non-urgent calls to be answered by voicemail.

Once the decision to route the call from the voicemail recording to an endpoint is made, the caller may be offered the option of having their call redirected. For example an announcement may be made to the caller. This announcement may be 'barged in', i.e. so the caller may be interrupted as they are speaking, for example with a distinctive sound and then presented aurally with an option to redirect their call to a specific endpoint. For example, if it is decided in the second routing decision that the call should be taken by the called user, the announcement may state that "[Called user] is now available to take your call. Would you like to be redirected?" As a further example, if it is decided in the second routing decision that the call is important and should be answered, but the called user cannot take the call or did not previously answer any of their communication devices, the announcement may state "[Called user] is not available to take your call at this time. Would you like to be redirected to (User X)?" The announcement could also go on to state who "User X" is, for example that they are member of the same team. The caller may be prompted to reply in a suitable manner, for example by speaking "yes" or "no", or using their telephone keypad (DTMF). In an alternative embodiment, the option to redirect the call may be presented at the end of the voicemail recording.

The second routing decision may be to route the call to a specific endpoint/user, or alternatively, all members of a particular collaborative group (such as a collaborative group to which the called user belongs) may be called, with the call being routed to the first endpoint that accepts the call.

An announcement regarding the reason for the call redirection and the urgency, context and/or relevant collaborative group may be made to the new endpoint, such that the user answering the call has some information which will help them to deal appropriately with the call. The announcement may also contain the transcription of the voicemail read out automatically. Alternatively, or in addition, the transcription of the voicemail may be sent as a text, instant message or email to the new endpoint. An element of a ringing program for sending the voicemail transcription by instant messaging may look like the following:

<location url="self" protocol = "IM" "announce vm_transcript End = "immediate">.

The value "vm_transcript" is a reserved value denoting the transcription of the voicemail and is defined below.

If the new endpoint is currently on a call, the announcement could be in the form of a call waiting indication. As with standard Call Waiting, the user could be given options to switch between their current call and the redirected call.

Additional ringing program constructs may be defined for use in the present invention. These include the following:

group_presence—the 'url' attribute of the 'location' element is supplied with the additional reserved values of 'group_presence' and 'group_presence_select'. The context of a call may have been supplied with an estimate of the group which is relevant to the current call. With the attributes, members of this group may be specified as endpoints of the current call. With 'group_presence', all members of the group may be rung with the first to answer being given the call. With 'group_presence_select', a single member of the group may be alerted to the call.

vm_transcript—the 'announce' attribute of the 'location' element may supplied with an additional reserved value of 'vm_transcript'. With the functioning of the speech analytics function, the current voicemail will have been passed through an automatic speech recognition system. This will produce a transcript of the voicemail which will be used within the speech analytics and which also may be stored in conjunction with the voicemail recording. The 'announce' reserved value will indicate that the transcript should be made as an announcement to the selected endpoint. The transcript can be used, for example, in cases in which the call is sent to a party other than the current user to help explain the call.

summary—the 'announce' attribute of the 'location' element may be supplied with an additional reserved value of 'summary'. As described above metadata associated with a call may be generated such as relevant collaborative group, call urgency, call concern such as customer retention etc. These may be placed into a summary and supplied to the endpoint in the appropriate format.

The additional context information generated by the transcription analysis module 106 may be stored as metadata in association with the voicemail recording. So for example, relevant group, call concerns such as customer retention, angry customer etc may be stored in association with the voicemail. If the call should not be answered, this may aid the called user in responding in the most appropriate way at a later time. Users may be supplied an interface/program that provides access to these records based on filters related to such metadata. So for example, members of a collaborative group may be allowed to access all voicemails related to that group. Managers or similar personnel my access voicemails from specific groups and with specific emotions such as anger.

Figure 3:
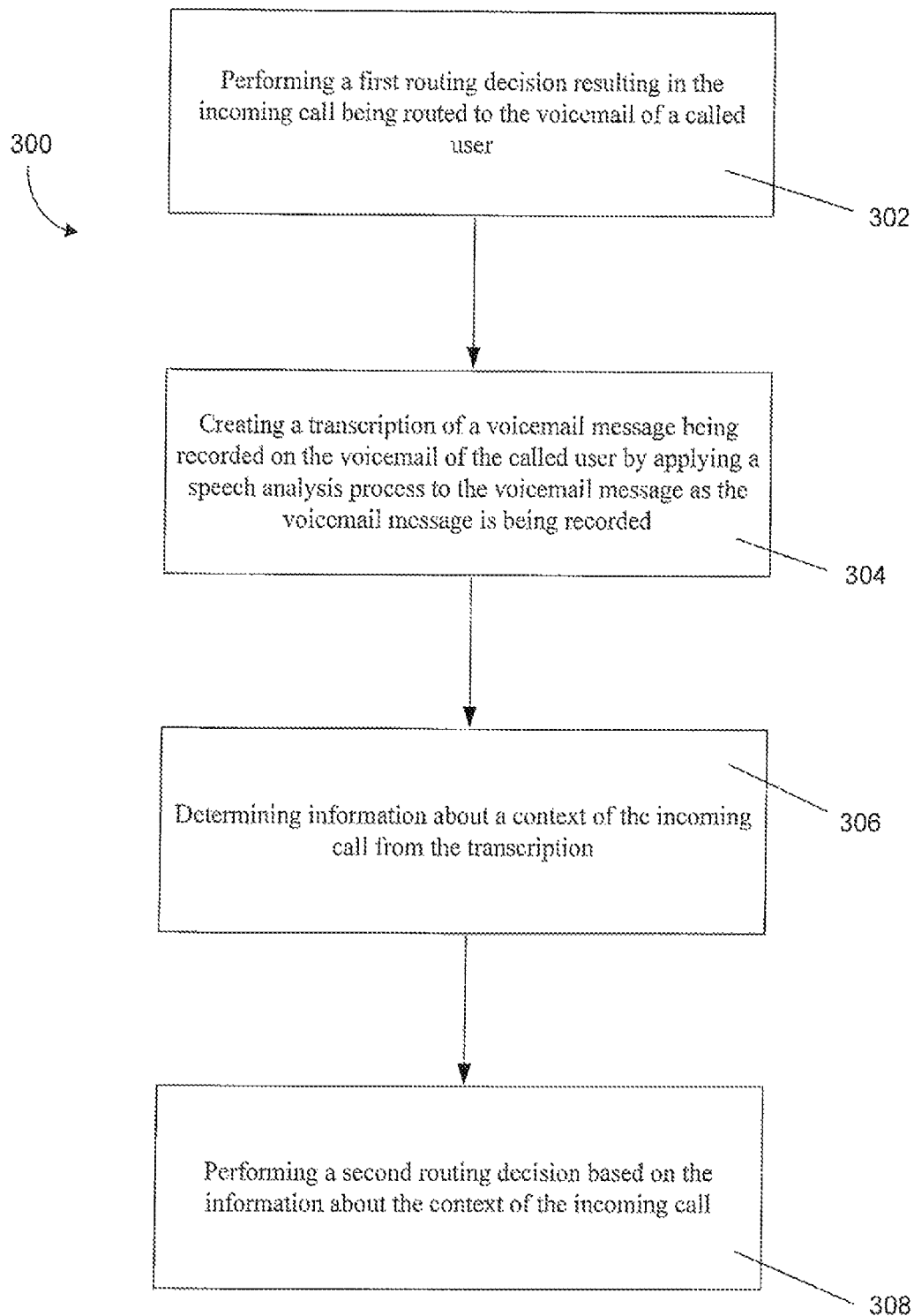
FIG. 3 is a flow chart illustrating exemplary operation of the system.

FIG. 3 is a flow chart illustrating a method 300 of routing an incoming call according to aspects of the invention. The method includes a step 302 of performing a first routing decision resulting in the incoming call being routed to the voicemail of a called user. In some embodiments, step 302 comprises deciding that the call should be routed to the user's voicemail. This may be because the user is in a meeting, the user has indicated that they are busy and only calls of a high priority should be forwarded to them, the user is at home or in a different time zone etc. In some other embodiments, step 302 comprises deciding that the call should be routed to the user, but the user does not answer any of their communication devices which are called, resulting in the so call be forwarded to the user's voicemail. Step 304 requires creating a transcription of a voicemail message being recorded on the voicemail of the called user by applying a speech analysis process to the voicemail message as the voicemail message is being recorded. Step 306 of the method requires determining information about a context of the incoming call from the transcription. The context may for example be an importance or urgency level, which may be descriptive (e.g. high importance, very high importance, internal, external etc) or numerical (e.g. 1-8). The context may alternatively or in addition indicate an emotional content of the call, for example if the caller appears to be angry. The context may alternatively or in addition indicate a reason for the call, for example if it appears that the callers wants to cancel some order or account, requires an update about an order or account, or wishes to place a new order etc. The context may alternatively or in addition indicate one or more collaborative groups which are relevant to the call and/or caller. For example if the call relates to a specific project, or the 'sales' team, 'technical' team, etc. Step 308 of the method requires performing a second routing decision based on the information about the context of the incoming call. Step 308 may comprise deciding to route the call to an endpoint of the called user if it was previously decided to route the call directly to the user's voicemail. Alternatively, if the user is not contactable, step 308 may comprise deciding to route the call to another user who can then deal with the call.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

The invention claimed is:

1. An apparatus for routing an incoming call, the apparatus being configured to:
   perform a first routing decision resulting in the incoming call being routed to the voicemail of a called user;
   create a transcription of a voicemail message being recorded on the voicemail of the called user by applying a speech analysis process to the voicemail message as the voicemail message is being recorded;
   determine information about a context of the incoming call from the transcription; and
   perform a second routing decision based on the information about the context of the incoming call; and
   subsequent to performing the second routing decision, to play a message to the caller at the end of the voicemail message recording, the message giving an option to route the call as per the second routing decision.

2. Apparatus according to claim 1, the apparatus comprising a selection module configured to use one or more of identity information associated with the incoming call, background information associated with a user making the incoming call and information about the presence, location and/or preferences of the called user to decide to route the incoming call to the voicemail of the called user.

3. Apparatus according to claim 1, wherein the apparatus is configured to route the incoming call to an endpoint of the called user and, when the incoming call is not answered at the endpoint, to route the call to the voicemail of the called user.

4. Apparatus according to claim 1, the apparatus comprising a transcription analysis module configured to compare the transcription of the voicemail to a stored list of words and/or phrases in order to determine information about the context of the incoming call from the transcription.

5. Apparatus according to claim 1, the apparatus comprising a context module configured to determine one or more of a subject, an importance level, an urgency level, a project identifier, a case reference, an identification of the caller and information about the caller in order to determine information about the context of the incoming call from the transcription.

6. Apparatus according to claim 1, the apparatus comprising a context module configured to determine one or more collaborative groups that are relevant to the incoming call.

7. Apparatus according to claim 6, wherein the context module is configured to use one or more of identity information associated with the incoming call and background information associated with a user making the incoming call in order to determine one or more collaborative groups that are relevant to the incoming call.

8. Apparatus according to claim 7, wherein the context module is configured to use the information about a context of the incoming call determined from the transcription in order to determine one or more collaborative groups that are relevant to the incoming call.

9. Apparatus according claim 1, wherein the apparatus is configured to route the incoming call to an endpoint of the called user in response to the second routing decision.

10. Apparatus according to claim 1, wherein the apparatus is configured to determine another user other than the called user and to route the incoming call to the other user in response to the second routing decision.

11. Apparatus according to claim 10, wherein the other user is a member of a same collaborative group as the called user.

12. Apparatus according to claim 1, wherein the apparatus is configured, subsequent to performing the second routing decision, to re-route the incoming call during the voicemail message recording.

13. Apparatus according to claim 12, wherein the apparatus is configured to play a message to the caller during the voicemail message recording indicating that the call is being re-routed.

14. A method of routing an incoming call, the method comprising:
    performing a first routing decision resulting in the incoming call being routed to the voicemail of a called user;
    creating a transcription of a voicemail message being recorded on the voicemail of the called user by applying a speech analysis process to the voicemail message as the voicemail message is being recorded;
    determining information about a context of the incoming call from the transcription; and
    performing a second routing decision based on the information about the context of the incoming call; and
    subsequent to performing the second routing decision, to play a message to the caller at the end of the voicemail message recording, the message giving an option to route the call as per the second routing decision.

* * * * *